(12) United States Patent
Schneider

(10) Patent No.: US 12,292,071 B2
(45) Date of Patent: May 6, 2025

(54) HYBRID SCREW WITH COMPARTMENTALIZED WEDGE GROOVE

(71) Applicant: Hilti Aktiengesellschaft, Schaan (LI)

(72) Inventor: Roland Schneider, Schlins (AT)

(73) Assignee: Hilti Aktiengesellschaft, Schaan (LI)

( * ) Notice: Subject to any disclaimer, the term of this patent is extended or adjusted under 35 U.S.C. 154(b) by 106 days.

(21) Appl. No.: 18/015,376

(22) PCT Filed: Jul. 2, 2021

(86) PCT No.: PCT/EP2021/068343
§ 371 (c)(1),
(2) Date: Jan. 10, 2023

(87) PCT Pub. No.: WO2022/012974
PCT Pub. Date: Jan. 20, 2022

(65) Prior Publication Data
US 2023/0279892 A1      Sep. 7, 2023

(30) Foreign Application Priority Data
Jul. 14, 2020   (EP) ..................................... 20185618

(51) Int. Cl.
*F16B 25/00* (2006.01)

(52) U.S. Cl.
CPC ...... *F16B 25/0078* (2013.01); *F16B 25/0026* (2013.01); *F16B 25/0042* (2013.01); *F16B 25/00* (2013.01)

(58) Field of Classification Search
CPC ........ F16B 13/14; F16B 13/141; F16B 25/00; F16B 25/0026; F16B 25/0042;
(Continued)

(56) References Cited

U.S. PATENT DOCUMENTS 4,856,951 A * 8/1989 Blucher ................ F16B 37/127
411/533
5,674,035 A * 10/1997 Hettich ............... F16B 25/0047
411/386

(Continued)

FOREIGN PATENT DOCUMENTS

DE   19820671 A1   11/1999
DE   10311471 A1    9/2004

(Continued)

OTHER PUBLICATIONS

International Search Report of PCT/EP2021/068343 dated Oct. 5, 2021.

(Continued)

*Primary Examiner* — Flemming Saether
(74) *Attorney, Agent, or Firm* — Davidson Kappel LLC

(57) ABSTRACT

A screw having a shank, wherein the shank has a tip end, a rear end, and a longitudinal axis extending through the tip end and through the rear end, wherein the tip end and the rear end are opposite ends of the shank, and a screw thread, which is connected to the shank, and which winds around the shank, wherein a wedge groove is provided in the shank, which wedge groove winds around the shank and extends alongside at least a section of the screw thread, wherein the wedge groove is delimited by a rearwardly tapered wedge flank for wedging a grout shell surrounding the shank. At least one ridge is provided within the wedge groove, wherein the ridge compartmentalizes the wedge groove.

11 Claims, 4 Drawing Sheets

(58) Field of Classification Search
CPC .... F16B 25/0078; F16B 33/008; F16B 33/02; F16B 35/00; F16B 35/041
USPC .............. 411/378, 411, 424, 16–18, 82, 82.3
See application file for complete search history.

(56) References Cited

U.S. PATENT DOCUMENTS

| | | | |
|---|---|---|---|
| 5,885,041 | A | 3/1999 | Giannuzzi et al. |
| 5,944,295 | A * | 8/1999 | McSherry ............. F16B 25/103 248/304 |
| 8,485,769 | B2 * | 7/2013 | Rosenkranz ............ F16B 25/00 411/14 |
| 9,464,524 | B2 | 10/2016 | Glogger et al. |
| 10,641,310 | B2 * | 5/2020 | Eckert ................. F16B 25/0068 |
| 2005/0158149 | A1 * | 7/2005 | Panasik .................... B21H 3/02 411/411 |
| 2008/0050198 | A1 * | 2/2008 | Ayrle .................... F16B 13/002 411/386 |
| 2013/0336744 | A1 | 12/2013 | Phua et al. |
| 2014/0023457 | A1 * | 1/2014 | Gaudron ............ F16B 25/0078 411/424 |
| 2016/0115989 | A1 * | 4/2016 | Hubmann ........... F16B 25/0015 411/411 |
| 2018/0106287 | A1 | 4/2018 | Eckert et al. |

FOREIGN PATENT DOCUMENTS

| | | |
|---|---|---|
| EP | 0104552 | 4/1984 |
| EP | 0930438 | 7/1999 |
| EP | 0705987 | 8/2002 |
| EP | 1544480 A1 | 6/2005 |
| EP | 2138728 A2 | 12/2009 |
| EP | 2354567 A1 | 8/2011 |
| EP | 2687735 | 1/2014 |
| EP | 3040563 A1 | 7/2016 |
| WO | WO2007012417 | 2/2007 |
| WO | WO 2016180661 A1 | 11/2016 |
| WO | WO 2020060902 A1 | 3/2020 |
| WO | WO2022/012974 A1 | 1/2022 |
| WO | WO 2022012975 A1 | 1/2022 |
| WO | WO 2022012976 A1 | 1/2022 |

OTHER PUBLICATIONS

International Search Report of PCT/EP2021/068344 dated Oct. 1, 2021.
International Search Report of PCT/EP2021/068360 dated Oct. 1, 2021.

* cited by examiner

HYBRID SCREW WITH COMPARTMENTALIZED WEDGE GROOVE

BACKGROUND

DE 10311471 A1 as well as EP 2138728 A2, EP 2354567 A1, U.S. Pat. No. 5,885,041 A1 and DE 19820671 A1 each describe screw-like elements which are intended to be installed in boreholes filled with chemical masses.

U.S. Pat. No. 9,464,524 B discloses an anchor rod for chemical anchoring.

SUMMARY OF THE INVENTION

It is an object of the invention to provide a screw with an additional grout wedge mechanism, which screw has particularly good performance at particularly low effort.

The invention relates to screws provided with an additional anchor mechanism, namely with a wedge-mechanism. This wedge-mechanism comprises a grout shell that surrounds the shank of the screw and a wedge flank, which is located at a helical wedge groove within the shank of the screw, and which is intended to wedge the grout shell radially outwardly as the shank is axially loaded in the pull-out direction (i.e. as the shank is rearwardly loaded). The invention is based on the fact that typical hardened grouts might have only a limited degree of extensibility. As a consequence, a continuous helical string of hardened grout arranged in the corresponding helical wedge groove cannot readily expand—rather, the helical string needs to, first of all, fracture before the string can be wedged out. Separation of the helical grout string into individual segments (i.e. lamella) might thus be essential for activating the wedge-mechanism.

In view of this, it is proposed to provide at least one axially extending ridge within the wedge groove, which ridge, depending on its height and geometry, can function as a predetermined breaking line for the helical grout string, or can subdivide the helical grout string into segments from the beginning. Accordingly, the at least one ridge provides segmentation of the helical grout string, which activates the wedge mechanism—and it does so in a particularly well-defined manner (in contrast to random fracturing). As a consequence, particularly good performance, in particular a particularly low variance of load bearing capacity, can be achieved in a particularly easy manner.

The shank is an elongate member and can, and in particular, be generally cylindrical, more preferably circular cylindrical. The tip end and the rear end, respectively, constitute opposite ends of the shank. The shank comprises a longitudinal axis, which extends through the rear end and through the tip end of the shank. The tip end is that end of the shank that is intended to be inserted first into a borehole when the screw is installed. The shank might be pointed at the tip end, but is preferably blunt or frustoconical at the tip end, in particular if the screw is a concrete screw. The screw would also comprise a drive for imparting torque on the shank. The drive could be located at the rear end of the shank, for example if the drive is a head, but it could also be located within the shank, for example if the screw is a headless screw.

The screw thread is usually generally helical, but could deviate from a strict mathematical helix, e.g. in order to provide additional functionality. The screw thread winds around the shank and the longitudinal axis of the shank, i.e. it turns helically around the shank, in particular by one or more turns, more preferably by at least two or three turns.

The screw thread is an external thread. It radially protrudes from the shank and can engage a mating internal thread. The screw thread is connected to the shank so as to transfer rearwardly directed pull-out loads. The screw thread can be monolithic with respect to the shank, or it can consist of one or more separate parts, which are non-monolithically connected to the shank.

The screw thread is preferably continuous, but could also have interruptions. For example, it could have a sawtooth structure at least in some regions, in particular within a start of the thread. The screw could also be provided with cutting bodies embedded in the screw thread, in particular in the start of the screw thread. For a particular easy design, the screw can comprise only a single screw thread. However, additional screw threads might also be provided, e.g. for additional functionality.

The wedge groove is usually generally helical, but could deviate from a strict mathematical helix, e.g. in order to provide additional functionality. The wedge groove winds around the shank and the longitudinal axis of the shank, i.e. it turns helically around the shank, in particular by one or more turns, more preferably by at least two or three turns. The wedge groove cuts into the shank, namely the lateral surface thereof. The wedge groove extends alongside at least a section of the screw thread, i.e. the screw thread and the wedge groove wind around the shank next to each other in at least a section of the shank. The wedge groove is, amongst others, delimited by the rearwardly tapered wedge flank. This wedge flank, which faces rearwardly (i.e. which faces the rear end of the shank), delimits the wedge groove towards the tip end. In addition, the wedge groove can be delimited, towards the rear end of the shank, by a forwardly facing flank, and optionally at the groove bottom by a bottom surface. The wedge flank, the forwardly facing flank and/or the bottom surface wind around the shank. Usually, these flanks are generally helical, but could deviate from a strict mathematical helix, e.g. in order to provide additional functionality. The wedge flank tapers rearwardly, i.e. it tapers towards the rear end of the shank. Accordingly, the distance of the wedge flank from the longitudinal axis may decrease as it approaches the rear end of the shank in the axial direction. Thus, the wedge flank forms a wedge that can wedge a grout shell surrounding the shank radially outwardly when the shank is loaded axially rearwardly.

The grout shell is a shell of hardened mass arranged within a borehole. The grout can e.g. be a mortar or a synthetic resin.

Throughout this document, wherever the terms "axially", "longitudinally", "radially" and "circumferentially" are used, this can, in particular, refer to the longitudinal axis of the shank, which usually coincides with the longitudinal axis of the screw.

The ridge can, preferably, extend parallel to the longitudinal axis. This can efficiently counteract undesired interaction of the grout segments.

The ridge, preferentially, projects from the wedge flank. Accordingly, there are adjacent wedge flank regions located on both sides of the ridge. Thus, the ridge is provided particularly close to the location where separation is required, which can further improve effectiveness of the wedge mechanism. When the ridge projects from the wedge flank, the ridge might also extend into other regions of the wedge groove.

The ridge can be sunk into the wedge groove. In this case, the ridge does not separate the helical grout string from the beginning, but can rather provide a predetermined breaking line, at which the grout string breaks into segments. Alternatively, the ridge can be flush with its surroundings (i.e. adjacent regions). In this case, the ridge might provide a higher degree of separation into segments already from the beginning of the installation process.

According to another preferred embodiment of the invention, a plurality of ridges is provided within the wedge groove, wherein the ridges compartmentalize the wedge groove. Preferentially, at least one ridge is provided per turn of the wedge groove. This leads to a particularly finely granulated segmentation, which might further increase the effectiveness of the wedge mechanism. If a plurality of ridges is provided, at least one of the ridges can be configured as described here in connection with a single ridge. Preferably, all of the ridges are configured in this manner.

As already hinted at above, the screw is preferably a concrete screw, i.e. the screw, in particular the screw thread thereof, is able to, at least partly, tap its mating internal screw thread groove in a concrete substrate. In particular, a ratio of the maximum outer thread diameter of the screw thread to the pitch of the screw thread can be between 1 and 2, in particular between 1.2 and 1.6, at least in some regions of the screw thread, more preferably at least in some regions of the screw thread located near the tip end, most preferably throughout the screw thread. These are typical dimensions for concrete screws.

BRIEF DESCRIPTION OF THE DRAWINGS

The invention is explained in greater detail below with reference to preferred exemplary embodiments, which are depicted schematically in the accompanying drawings. Individual features of the exemplary embodiments presented below can be implemented either individually or in any combination within the scope of the present invention.

DETAILED DESCRIPTION

Figure 1:
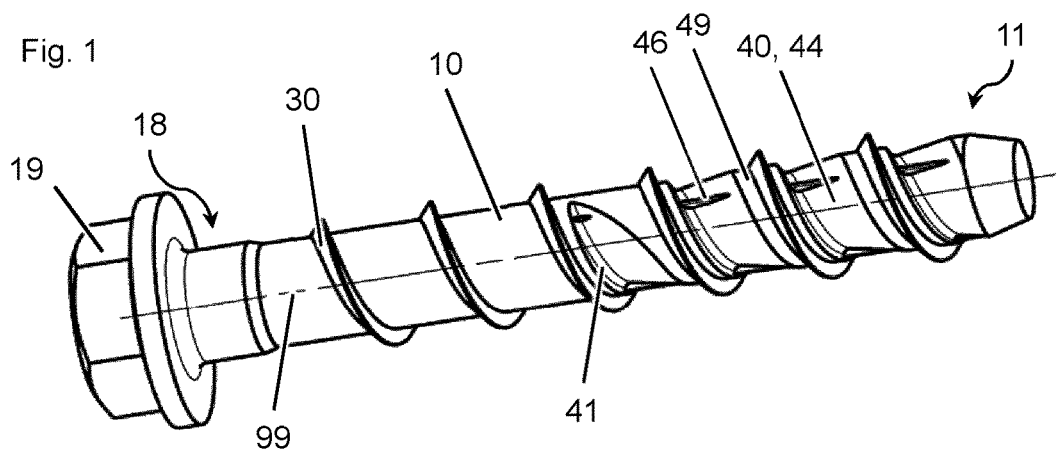
FIG. 1 is an isometric view of a screw according to a first embodiment.
Figure 2:
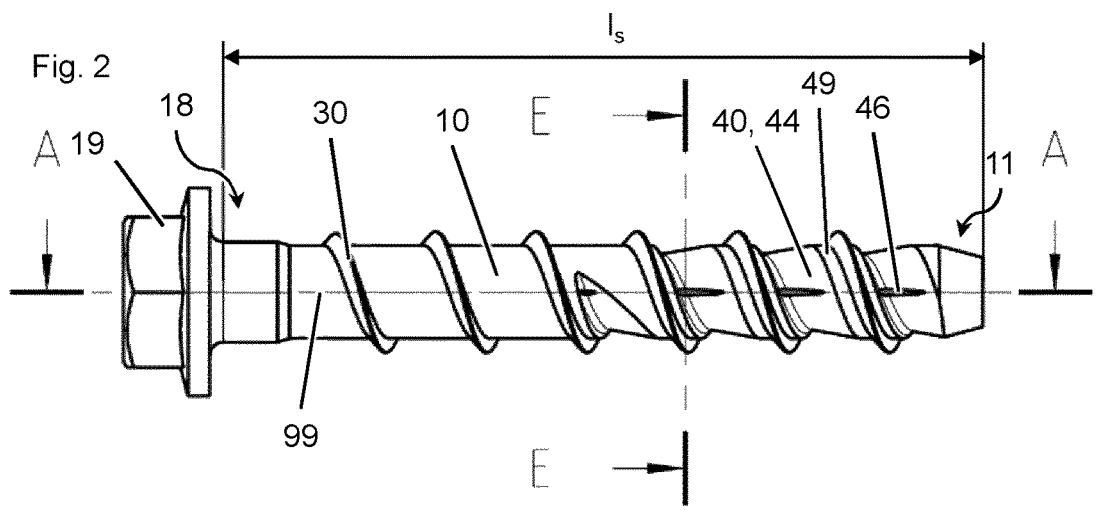
FIG. 2 is a side view of the screw according to the first embodiment.
Figure 3:
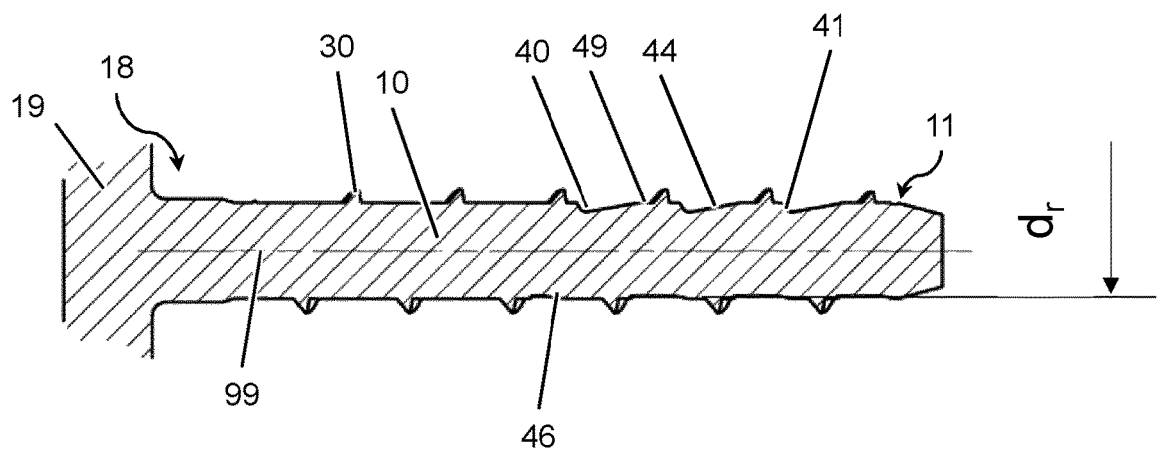
FIG. 3 is a longitudinal section according to A-A in FIG. 2, and including the longitudinal axis of the screw's shank, of the screw according to the first embodiment.
Figure 4:
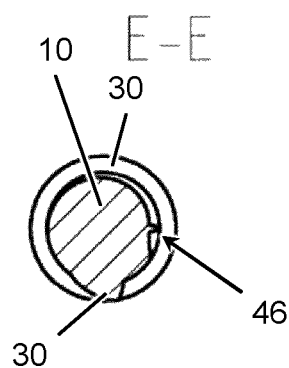
FIG. 4 is a cross-sectional view, according to E-E in FIG. 2, perpendicular to the longitudinal axis of the screw's shank, of the screw according to the first embodiment.
Figure 5:
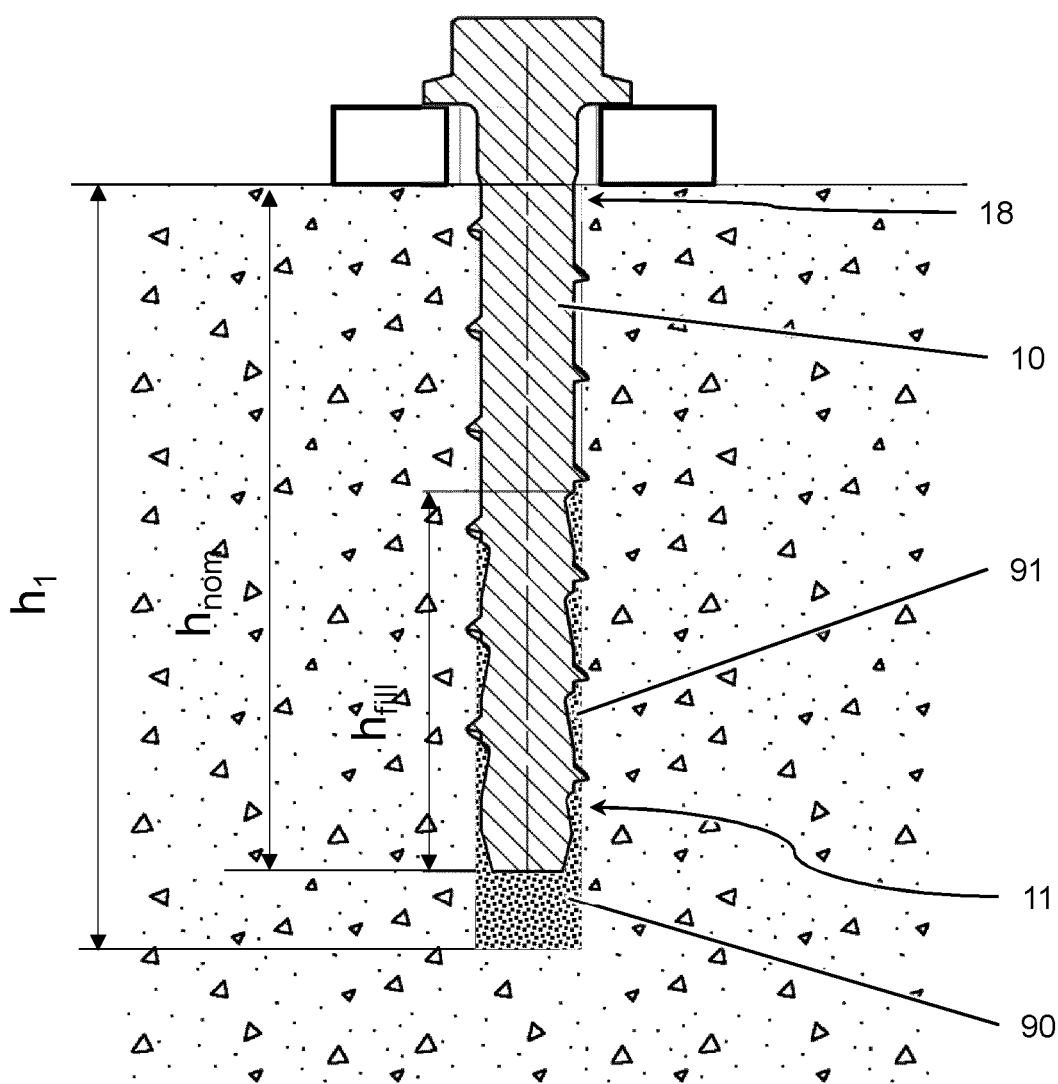
FIG. 5 shows the screw according to the first embodiment arranged in a borehole and embedded in a grout shell.
Figure 6:
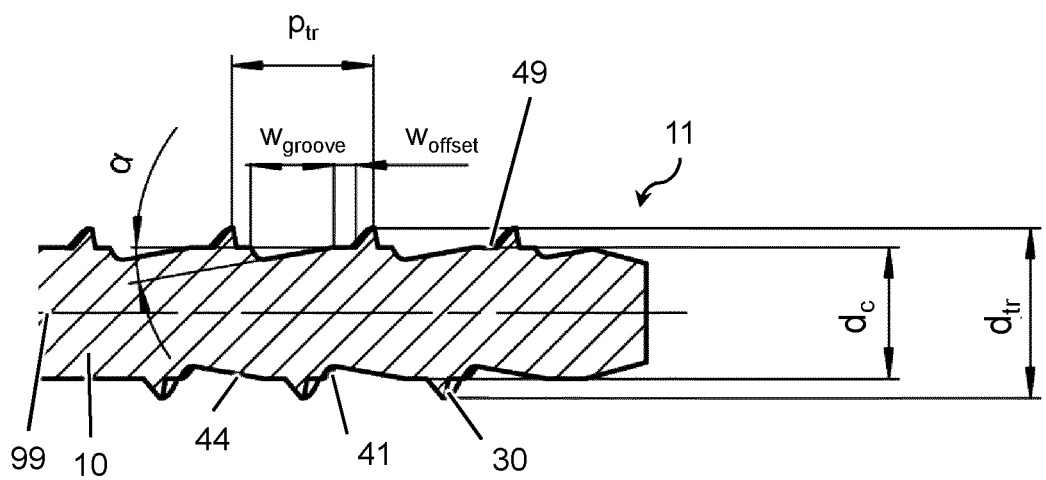
FIG. 6 is a detail of the screw according to the first embodiment, in longitudinal section that includes the longitudinal axis of the screw's shank.

FIGS. 1 to 7 illustrate a first embodiment of a screw. The screw comprises an elongate shank 10, which has a tip end 11. The tip end 11 is the leading end of the shank 10 and the shank 10 is intended to be inserted with the tip end 11 first into a borehole 90 when the screw is installed. The shank 10 also has rear end 18, which is located opposite the tip end 11. In particular, the shank 10 can be generally circular cylindrical. The screw furthermore has a screw drive 19 that is connected to the shank 10, monolithically in the present case by way of example, for applying torque to the shank 10. In the shown embodiment, the screw drive 19 is a hex head located at the rear end 18, but this is an example only. Any other type of screw drive 19 can be used, such as an external type, for example hex, line (ALH), square, or a socket head, for example Bristol, clutch, double hex, hex socket, hexalobular socket, line (ALR), polydrive, Robertson, spline, TP3, and others. The screw drive 19 could also be located within the shank 10 and/or remote from the rear end 18, in particular if the screw is headless and/or internally threaded.

The elongate shank 10 comprises a longitudinal axis 99, extending in the longitudinal direction of the shank 10 and through both the tip end 11 and through the rear end 18.

The screw furthermore comprises a screw thread 30, which is located on the shank 10, which winds around the shank 10 and/or the longitudinal axis 99, and which projects radially, with respect to the longitudinal axis 99, from the shank 10. In particular, the screw thread 30 is arranged coaxially with respect to the longitudinal axis 99. The screw thread 30 is an external screw thread. The screw thread 30 is generally helical. However, it could also deviate from a strict mathematical helix, e.g. for additional functionality. In the present embodiment, the shank 10 and the screw thread 30 are monolithic. However, alternatively, at least a section of the screw thread 30, or all of the screw thread 30, might be separate from the shank 10. Whereas in the present embodiment, the screw thread 30 is shown to be a monolithic part, it might also consist of separate elements. In particular, the shank 10 and/or screw thread 30 consist of a metal material, preferably a steel material, most preferably a stainless steel. The shank 10 and/or screw thread 30 could also be provided with a respective coating, comprising one or more layers.

In the present embodiment, the screw thread 30 is shown to be continuous. However, it could also be non-continuous, for example in order to provide a serration.

Whereas in the shown embodiment, no additional screw threads are shown, the screw might also have additional screw threads, formed monolithically or non-monolithically with respect to the shank 10.

A wedge groove 40 is provided in the shank 10, wherein the wedge groove 40 projects radially, with respect to the longitudinal axis 99, into the shank 10. The wedge groove 40 extends alongside the screw thread 30 and it flanks the screw thread 30, at least a section thereof. Like the screw thread 30, the wedge groove 40 thus winds around the shank 10 and/or around the longitudinal axis 99, and the wedge groove 40 is generally helical (again with possible deviations from a strict mathematical helix). The helical wedge groove 40 is arranged coaxially with respect to the longitudinal axis 99. In particular, the wedge groove 40 extends parallelly alongside the screw thread 30. In particular, the wedge groove 40 and the screw thread 30 have the same pitch.

The wedge groove 40 is delimited by a forwardly facing flank 41 and a rearwardly facing flank 44. Whereas in the shown embodiment, the forwardly facing flank 41 merges into the rearwardly facing flank 44, there might also be provided a bottom surface adjoining both flank 41 and flank 44, and located between flank 41 and flank 44, which bottom surface delimits the bottom of the wedge groove 40. Since the wedge groove 40 is generally helical, so are the forwardly facing flank 41, the rearwardly facing flank 44 and/or the bottom surface.

The rearwardly facing flank 44 (see, e.g, FIG. 5) is rearwardly tapering, i.e. when seen in a longitudinal section including the longitudinal axis 99, its distance from the longitudinal axis 99 decreases towards the rear end 18 of the shank 10. In other words, the rearwardly facing flank 44 converges towards the rear end 18 of the shank 10, wherein a focus of convergence can preferably be the longitudinal axis 99 of the shank 10.

Figure 7:
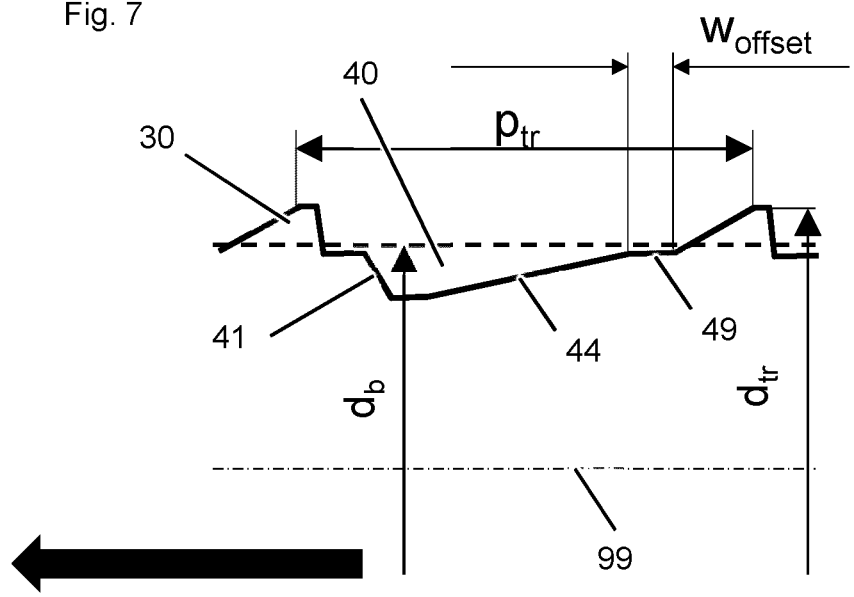
FIG. 7 is another detail of the screw according to the first embodiment, in longitudinal section that includes the longitudinal axis of the screw's shank.

The rearwardly facing flank 44 forms a helical wedge, which is able to wedge a grout shell 91 that surrounds the shank 10 radially outwardly as the shank 10 is rearwardly loaded (Rearwards can be considered the direction pointing, parallel to the longitudinal axis 99, from the tip end 11 to the rear end 18 of the shank 10, which is the direction indicated with a thick arrow in FIG. 7. The rearward direction is also the pull-out direction). The flank 44 can thus form an additional anchoring mechanism for anchoring the shank 10 in a grouted borehole 90, which is effective in addition to an interlock of the screw thread 30 with the wall of the borehole 90. The flank 44 is thus a wedge flank 44 for wedging the grout shell 91 surrounding the shank 10.

Wedge-shaped lamellae of the grout shell 91 may be radially displaced in case of axial displacement of the shank 10 in the substrate, which for example occurs during tensile loading and especially in cracked concrete condition. As a consequence, a friction and/or deadlock reaction between the shank 10 and the borehole wall can emerge, which can provide an additional load transfer mechanism between the screw and the substrate.

As can be seen particularly well in FIG. 7, a buffer zone 49 is provided between, in particular axially between, the wedge flank 44 and the screw thread 30 located adjacent to the wedge flank 44. The buffer zone 49 adjoins, namely at its rear edge, the wedge flank 44, and further adjoins, namely at its front edge, the screw thread 30, in particular the rearwardly facing flank of the screw thread 30. The buffer zone 49 is thus sandwiched between the wedge flank 44 and the screw thread 30. In the buffer zone 49, the shank 10 has less rearward taper as compared to the wedge flank 44. Accordingly, the cone angle, measured with respect to the longitudinal axis of the shank 10, is smaller in the buffer zone 49 than it is at the wedge flank 44. In particular, the taper and/or the cone angle might be zero in the buffer zone 49, which is shown in the present embodiment. In this case, the buffer zone 49 can have a generally circular cylindrical lateral surface, as shown in the present embodiment.

The buffer zone 49 provides an offset, in the longitudinal direction, between wedge flank 44 and the screw thread 30. This offset can counteract large-surface collision of grout shell lamellae wedged by the wedge flank 44 with the screw thread 30 when the shank 10 is rearwardly loaded, i.e. loaded in the pull-out direction illustrated with the thick solid arrow shown in FIG. 7. As a consequence, the lamellae can retain contact with both the shank 10 and the surrounding substrate, and continue to transfer radial loads.

The rearward taper of the rearward flank of the screw thread 30 is larger than the rearward taper of the buffer zone 49.

The screw is a concrete screw, i.e. the screw thread 30 is able to tap, in particular cut, a corresponding mating thread in a concrete substrate. In particular, the screw can be so configured that it is able to be anchored within a concrete borehole by means of engagement of the screw thread 30 only (i.e. without grout). A grout shell 91, i.e. a shell of hardened mass, can be provided in order to provide additional anchoring by means of the mechanism described above.

The screw thread 30 has an outer thread diameter $d_{tr}$. The ratio of the maximum outer thread diameter $d_{tr}$ of the screw thread 30 to the pitch $p_{tr}$ of the screw thread 30 is preferably between 1 and 2, in particular between 1.2 and 1.6. At least one of the following thread parameters can preferably be employed for the screw thread 30:

$d_{tr}/d_b$=1.1 to 1.3 (ratio outer thread diameter to borehole diameter);

$p_{tr}/d_b$=0.7 to 1.1 (ratio screw thread pitch to borehole diameter);

flank angle of the screw thread 30=30° to 60°, wherein the screw thread 30 can have non-symmetric thread cross section, as shown, or, in an alternative embodiment, symmetric cross-section.

The screw thread 30 has a plurality of turns, namely approximately six turns in the shown embodiment. Preferably, it has at least two turns. In the present embodiment, the screw thread 30 spans, longitudinally (i.e. in the direction parallel to the longitudinal axis 99), approximately 80% of the length $l_s$ of the shank 10. The screw thread 30 thus forms a main thread of the screw.

The wedge groove 40, on the other hand, has less turns than screw thread 30 has (the wedge groove 40 has approximately three turns in the present embodiment), and the wedge groove 40 spans approximately 40% of the length $l_s$ of the shank 10. In particular, the screw thread 30 extends closer to the rear end 18 of the shank 10 than does the wedge groove 40 (and/or the wedge flank 44). In particular, the screw thread 30 extends closer to the rear end 18 of the shank 10 than does the wedge groove 40 (and/or the wedge flank 44) by at least one turn of the screw thread 30 (by approximately two turns in the present embodiment). Accordingly, the screw thread 30 has at least one turn (two turns in the present embodiment) that is located axially between the rear end 18 of the shank 10 and the wedge groove 40 and/or the screw thread 30 has at least one turn that is located axially between the rear end 18 of the shank 10 and the wedge flank 44. In other words, the screw thread 30 extends closer to the rear end 18 of the shank 10 than does the wedge groove 40 and/or the wedge flank 44 by at least one time the pitch $p_{tr}$ of the screw thread 30. Due to this offset, the wedging mechanism provided by the wedge flank 44 is concentrated deep within the borehole 90, where the loading capacity of the substrate is usually highest, and/or where the substrate can usually absorb radial loads particularly well.

Figure 8:
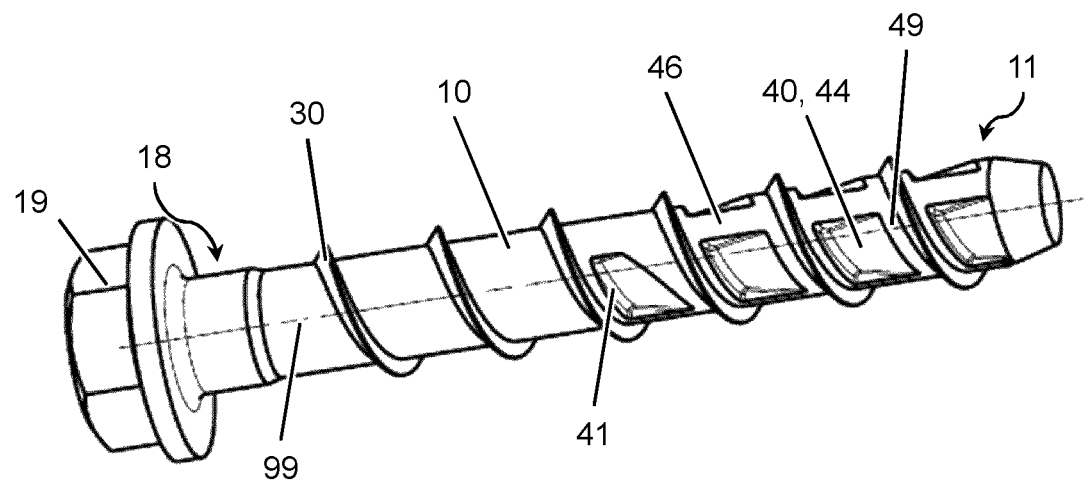
FIG. 8 is an isometric view of a screw according to a second embodiment.

As already mentioned above, the screw thread 30 might be strictly mathematically helical, but might also deviate from a helical form, which can e.g. provide additional functionality. Likewise, the wedge groove 40 and/or the wedge flank 44 might be strictly mathematically helical, but might also deviate from a helical form, which can e.g. provide additional functionality The screw comprises a plurality of axially extending ridges 46 (see, e.g., FIG. 1), which are located, at least partly, within the wedge groove 40, and which divide the wedge groove 40 into a helical succession of compartments or bays. In case of the first embodiment shown in FIGS. 1 to 7, the ridges 46 do not completely cover the longitudinal cross-section of the wedge groove 40, and the ridges are slightly sunk into the wedge groove 40, as can be for example taken from FIGS. 2 and 3. In contrast, in the second embodiment shown in FIG. 8, the ridges 46 completely cover the longitudinal cross-section of the wedge groove 40, and they are flush with their surrounding regions of the shank 10, at least they are flush with buffer zone 49. Moreover, in case of the second embodiment, the ridges 46 are broader as compared to the first embodiment.

In both embodiments, the ridges 46 form predetermined breaking locations (in particular predetermined breaking lines) or separator locations (in particular separator lines) for the grout shell 91 that surrounds the shank 10, which can cause the grout shell 91 to divide into individual segments when the shank 10 is rearwardly loaded, thereby activating the wedging mechanism.

In both embodiments, the ridges 46 extend longitudinally, in particular they extend generally parallel to the longitudinal axis 99. In both embodiments, they project radially outwardly from the wedge flank 44 and/or from the forwardly facing flank 41 of the wedge groove 40.

Except for the different design of the respective ridges 46, the two shown embodiments are generally identical. Therefore, with regards to the details of the embodiment of FIG. 8, reference is made to the description of the embodiment of FIGS. 1 to 7, which can be applied mutatis mutandis.

The screws of both embodiments can be screwingly inserted into a non-grouted borehole 90 in a concrete substrate, and the screw thread 30 can provide sufficient anchoring action. Alternatively, the respective screws can also be installed together with grout (i.e. a hardenable chemical mass) that is filling the gaps between shank 10 and borehole wall. In this case, grout fills also the individual cone-shaped compartments, so that wedge-shaped grout segments, separated by the ridges 46, are formed. In particular, the grout is chosen so that it does not glue or bond to the (steel) surface of the shank 10. Any bonding action with the shank 10 has usually to be minimized (optionally using surface treatment or coatings, e.g. organic wax coatings). In contrast, the grout should bond to the borehole wall, by chemical bonding and/or by mechanical interlock that is provided by any small geometrical "imperfection" such as roughness, local breakouts, corrugations or the like. When the shank 10 is rearwardly loaded in the axial direction, loads are transferred into the substrate both via mechanical interlock between the screw thread 30 and the borehole wall and via the wedging mechanism provided by the wedge flank 44 acting on the (hardened) grout.

In both embodiments, at least one of the following thread parameters can preferably be employed for the wedge groove 40:

$W_{groove}/p_{tr}$=0.5-0.95 (ratio of width of wedge groove 40 in axial direction to pitch of screw thread 30)

$W_{offset}/p_{tr}$=0.1-0.5 (ratio of width of buffer zone 49 in axial direction to pitch of screw thread 30)

Cone angle α of wedge flank 44=5°-30°

$d_r/d_c$=0.6-1.1 (ratio of diameter of the ridges 46 to core diameter of screw thread 30) Number of ridges 46 per turn of the wedge groove 40: at least one per turn, preferably two ridges 46 or more per turn

What is claimed is:

1. A screw comprising:
    a shank having a tip end, a rear end, and a longitudinal axis extending through the tip end and through the rear end, the tip end and the rear end being opposite ends of the shank;
    a screw thread connected to the shank and winding around the shank;
    a wedge groove being provided in the shank, the wedge groove winding around the shank and extends alongside at least a section of the screw thread, the wedge groove being delimited by a rearwardly tapered wedge flank for wedging a grout shell surrounding the shank; and
    at least one ridge within the wedge groove, wherein the ridge compartmentalizes the wedge groove.

2. The screw as recited in claim 1 wherein the ridge extends parallel to the longitudinal axis.

3. The screw as recited in claim 1 wherein the ridge projects from the wedge flank.

4. The screw as recited in claim 1 wherein the ridge is sunk into the wedge groove or is flush with a surrounding of the wedge groove.

5. The screw as recited in claim 1 wherein the at least one ridge includes a plurality of ridges provided within the wedge groove, the ridges compartmentalizing the wedge groove.

6. The screw as recited in claim 5 wherein at least one ridge per turn of the wedge groove is provided.

7. The screw as recited in claim 1 wherein the screw is a concrete screw.

8. The screw as recited in claim 7 wherein a ratio of the maximum outer thread diameter of the screw thread to the pitch of the screw thread is between 1 and 2 at least in some regions of the screw thread.

9. The screw as recited in claim 8 except for wherein a ratio of the maximum outer thread diameter of the screw thread to the pitch of the screw thread is between 1.2 and 1.6 at least in some regions of the screw thread.

10. The screw as recited in claim 1 wherein a ratio of the maximum outer thread diameter of the screw thread to the pitch of the screw thread is between 1 and 2 at least in some regions of the screw thread.

11. The screw as recited in claim 10 except for wherein a ratio of the maximum outer thread diameter of the screw thread to the pitch of the screw thread is between 1.2 and 1.6 at least in some regions of the screw thread.

* * * * *